(12) United States Patent
Zanoni et al.

(10) Patent No.: US 9,197,471 B1
(45) Date of Patent: Nov. 24, 2015

(54) OPTICALLY INTERLEAVED PHOTONIC ANALOG TO DIGITAL CONVERTERS

(71) Applicants: Raymond Zanoni, Columbia, MD (US); Kim S. Jepsen, Ellicott City, MD (US); Oliver S. King, Frederick, MD (US); Mark A. Laliberte, Crownsville, MD (US)

(72) Inventors: Raymond Zanoni, Columbia, MD (US); Kim S. Jepsen, Ellicott City, MD (US); Oliver S. King, Frederick, MD (US); Mark A. Laliberte, Crownsville, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 112 days.

(21) Appl. No.: 14/023,338

(22) Filed: Sep. 10, 2013

Related U.S. Application Data

(63) Continuation-in-part of application No. 13/243,208, filed on Sep. 23, 2011, now Pat. No. 8,548,331, and a continuation-in-part of application No. 13/787,202, filed on Mar. 6, 2013, which is a continuation-in-part of application No. 13/536,929, filed on Jun. 28, 2012, now Pat. No. 8,837,956, and a continuation-in-part of application No. 13/626,642, filed on Sep. 25, 2012, now Pat. No. 8,779,955, and a continuation-in-part of application No. 13/204,158, filed on Aug. 5, 2011, now Pat. No. 8,442,402, and a continuation-in-part of application No. 13/240,226, filed on Sep. 22, 2011, now Pat. No. 8,456,336.

(51) Int. Cl.
*H04B 10/00* (2013.01)
*H04L 27/22* (2006.01)

(52) U.S. Cl.
CPC .................................. *H04L 27/223* (2013.01)

(58) Field of Classification Search
USPC .................................................. 398/202–214
See application file for complete search history.

(56) References Cited

U.S. PATENT DOCUMENTS

| | | | |
|---|---|---|---|
| 4,384,291 A | 5/1983 | Lewis et al. | |
| 4,694,276 A * | 9/1987 | Rastegar | ........................ 341/137 |
| 4,732,447 A | 3/1988 | Wright et al. | |
| 4,928,007 A | 5/1990 | Furstenau et al. | |
| 4,968,986 A | 11/1990 | Wagner | |
| 5,010,346 A | 4/1991 | Hamilton et al. | |
| 5,109,441 A | 4/1992 | Glaab | |
| 5,955,875 A * | 9/1999 | Twichell et al. | ................. 324/96 |
| 6,118,396 A * | 9/2000 | Song | ............................. 341/137 |

(Continued)

FOREIGN PATENT DOCUMENTS

WO    WO-2011/010314 A2    1/2011

OTHER PUBLICATIONS

Office Action on U.S. Appl. No. 13/787,202 Dated Nov. 25, 2014, 19 pages.

(Continued)

*Primary Examiner* — Agustin Bello
(74) *Attorney, Agent, or Firm* — Angel N. Gerdzhikov; Donna P. Suchy; Daniel M. Barbieri

(57) ABSTRACT

A method of and system of processing a phase-modulated optical signal includes performing, by demodulators, demodulation of the phase-modulated optical signal and outputting optical demodulated signals. The processing further includes performing, by pairs of gated photo detectors respectively connected to the I/Q demodulators, photo detection of the demodulated signals. The processing further tracks and holds electronicversions of the demodulated signals with a track and hold amplifier.

21 Claims, 7 Drawing Sheets

(56) References Cited

U.S. PATENT DOCUMENTS

| | | | |
|---|---|---|---|
| 6,188,342 B1 | 2/2001 | Gallo | |
| 6,326,910 B1 * | 12/2001 | Hayduk et al. | 341/137 |
| 6,404,365 B1 | 6/2002 | Heflinger | |
| 6,404,366 B1 | 6/2002 | Clark et al. | |
| 6,420,985 B1 | 7/2002 | Toughlian et al. | |
| 6,459,522 B2 | 10/2002 | Yariv | |
| 6,469,649 B1 | 10/2002 | Helkey et al. | |
| 6,525,682 B2 | 2/2003 | Yap et al. | |
| 6,529,150 B1 | 3/2003 | Shoop et al. | |
| 6,567,436 B1 | 5/2003 | Yao et al. | |
| 6,661,361 B1 * | 12/2003 | Lewis et al. | 341/137 |
| 6,700,517 B1 | 3/2004 | Kellar | |
| 6,714,149 B2 | 3/2004 | Nunnally | |
| 6,771,201 B1 | 8/2004 | Currie | |
| 7,376,349 B2 | 5/2008 | Ionov et al. | |
| 7,389,055 B1 * | 6/2008 | Rickard et al. | 398/206 |
| 7,471,224 B2 | 12/2008 | Babbitt et al. | |
| 7,564,387 B1 * | 7/2009 | Vawter et al. | 341/137 |
| 7,570,184 B2 | 8/2009 | Ikeda et al. | |
| 7,671,771 B2 | 3/2010 | Hirono et al. | |
| 7,826,752 B1 | 11/2010 | Zanoni et al. | |
| 7,847,715 B2 | 12/2010 | Keith | |
| 7,867,246 B2 | 1/2011 | Kim | |
| 7,868,799 B1 * | 1/2011 | Price et al. | 341/137 |
| 7,876,246 B1 * | 1/2011 | Price et al. | 341/118 |
| 7,956,788 B2 | 6/2011 | Lee et al. | |
| 7,990,299 B2 | 8/2011 | Bell | |
| 8,263,928 B1 * | 9/2012 | Efimov | 250/227.11 |
| 8,315,387 B2 | 11/2012 | Kanter et al. | |
| 8,442,402 B1 * | 5/2013 | Zanoni et al. | 398/115 |
| 8,446,305 B1 * | 5/2013 | Zanoni et al. | 341/137 |
| 8,456,336 B1 * | 6/2013 | Zanoni et al. | 341/137 |
| 8,466,819 B2 * | 6/2013 | Woodward et al. | 341/137 |
| 8,548,331 B1 * | 10/2013 | Zanoni et al. | 398/115 |
| 8,779,955 B1 * | 7/2014 | Zanoni et al. | 341/137 |
| 8,837,956 B1 * | 9/2014 | Zanoni et al. | 398/202 |
| 2002/0067299 A1 * | 6/2002 | Clark et al. | 341/137 |
| 2002/0163454 A1 * | 11/2002 | Yap et al. | 341/137 |
| 2006/0093375 A1 | 5/2006 | Futami et al. | |
| 2007/0159369 A1 * | 7/2007 | Currie et al. | 341/144 |
| 2009/0236501 A1 | 9/2009 | Takahashi et al. | |
| 2010/0002281 A1 | 1/2010 | McDonald | |
| 2011/0002029 A1 | 1/2011 | McDonald | |
| 2011/0221627 A1 * | 9/2011 | Pierno et al. | 342/54 |
| 2011/0234435 A1 | 9/2011 | Woodward et al. | |
| 2012/0087653 A1 | 4/2012 | Sawada et al. | |
| 2012/0212360 A1 * | 8/2012 | Kanter et al. | 341/120 |
| 2012/0213531 A1 * | 8/2012 | Nazarathy et al. | 398/202 |
| 2012/0219302 A1 | 8/2012 | Sun et al. | |
| 2012/0224184 A1 | 9/2012 | Li et al. | |
| 2012/0299446 A1 | 11/2012 | Shmilovich et al. | |
| 2013/0016004 A1 * | 1/2013 | Pierno et al. | 342/195 |
| 2013/0077962 A1 | 3/2013 | Wu et al. | |
| 2013/0113641 A1 | 5/2013 | Sudo et al. | |
| 2013/0136450 A1 | 5/2013 | Roberts et al. | |
| 2013/0328706 A1 | 12/2013 | Marom | |
| 2014/0005966 A1 | 1/2014 | Fireaizen et al. | |

OTHER PUBLICATIONS

U.S. Appl. No. 13/536,929, filed Jun. 28, 2012, Zanoni et al.
U.S. Appl. No. 13/626,642, filed Sep. 25, 2012, Zanoni et al.
Office Action on U.S. Appl. No. 13/536,929 Dated Mar. 6, 2014, 10 pages.
U.S. Appl. No. 13/787,202, filed Mar. 6, 2013, Zanoni et al.
Clark et al., Coherent Optical Phase-Modulation Link, IEEE Photonics Technology Letters, Aug. 15, 2007, 3 pages.
Clark et al., Photonics for RF Front Ends, IEEE Microwave Magazine, May 2011, 9 pages.
Valley et al., Photonic Analog-To-Digital Converters: Fundamental and Practical Limits, Integrated Optical Devices, Nanostructures, and Displays, Proceedings of SPIE, 2004, 11 pages.
Valley, Photonic Analog-to-Digital Converters, The Aerospace Corporation, 2009, 48 pages.
Valley, Photonic Analog-To-Digital Converters, The Aerospace Corporation, Mar. 5, 2007, 28 pages.
Zibar et al., Digital Coherent Receiver Employing Photonic Downconversion for Phase Modulated Radio-over-Fibre Links, downloaded on Aug. 2, 2010 from IEEE Xplore, 4 pages.
Zibar et al., Digital Coherent Receiver for Phase-Modulated Radio-Over-Fiber Optical Links, IEEE Photonics Technology Letters, Feb. 1, 2009, 3 pages.
Notice of Allowance for U.S. Appl. No. 13/204,158, mail date Jan. 29, 2013, 10 pages.
Notice of Allowance for U.S. Appl. No. 13/240,226, mail date Feb. 14, 2013, 4 pages.
Notice of Allowance for U.S. Appl. No. 13/243,208, mail date Jun. 6, 2013, 11 pages.
Final Office Action on U.S. Appl. No. 13/787,202 Dated May 19, 2015, 22 pages.
Kikuchi, Coherent Optical Communications: Historical Perspectives and Future Directions, 2010, High Spectral Density Optical Communication Technologies, Optical and Fiber Communication Reports, Springer-Verlag Berlin Heidelber, pp. 11-49.
Office Action on U.S. Appl. No. 13/963,899 Dated Feb. 12, 2015, 16 pages.

* cited by examiner

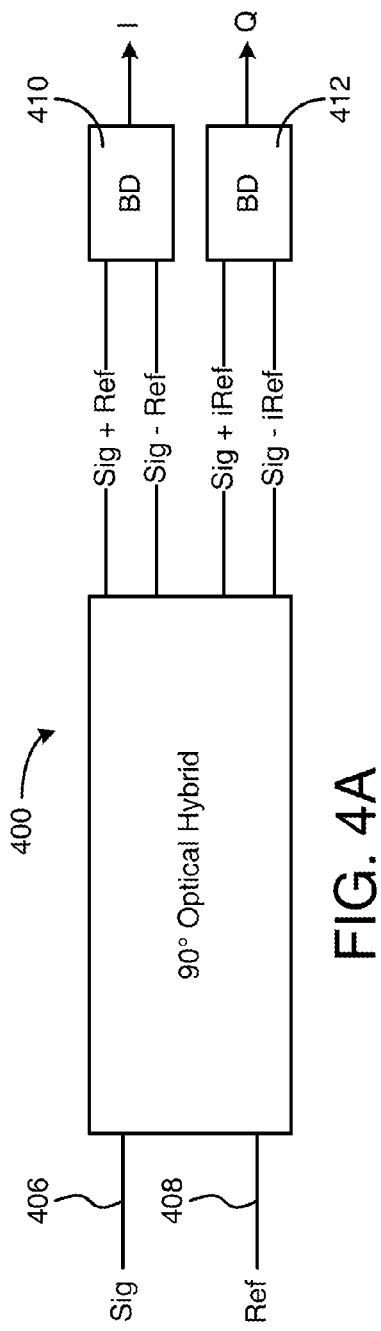
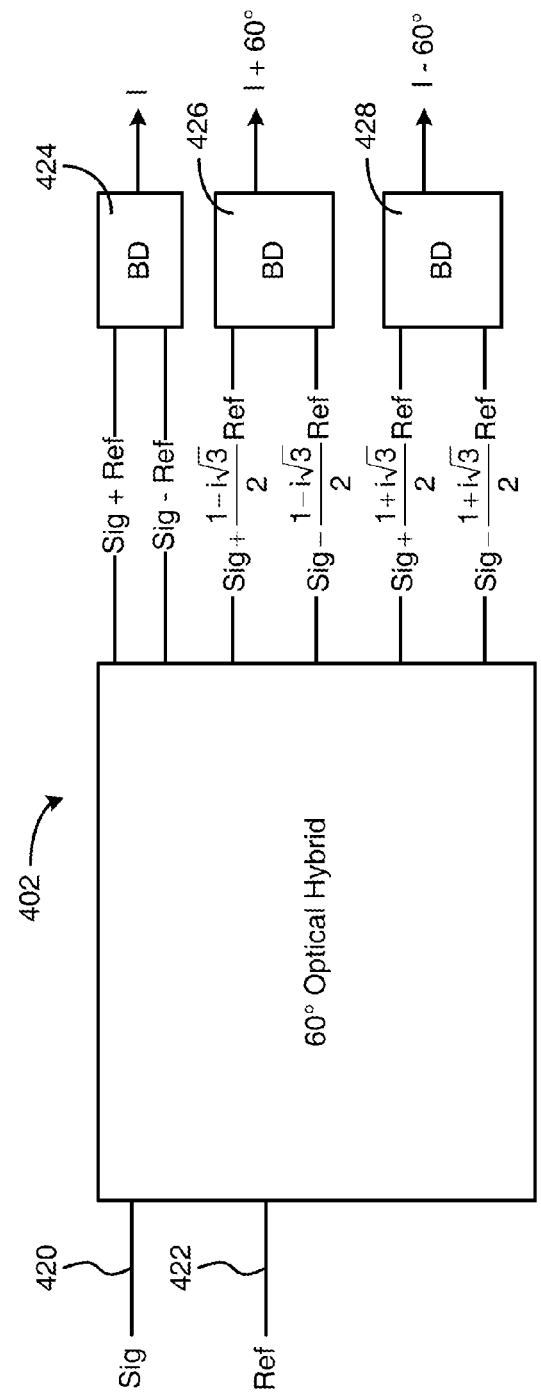
FIG. 4A
FIG. 4B

OPTICALLY INTERLEAVED PHOTONIC ANALOG TO DIGITAL CONVERTERS

CROSS-REFERENCE TO RELATED PATENT APPLICATIONS

The present application claims the benefit of and priority to and is a continuation-in-part of U.S. application Ser. No. 13/243,208, filed on Sep. 23, 2011 entitled "OPTICALLY INTERLEAVED ELECTRONIC ANALOG TO DIGITAL CONVERTERS" by Zanoni et al. (11CR245 ('803)), and claims the benefit of and priority to and is a continuation-in-part of U.S. application Ser. No. 13/787,202, filed on Mar. 6, 2012, entitled "OPTICAL SAMPLE AND HOLD SYSTEM AND METHOD" by Zanoni et al. (11CR368CIP (910)), which is a continuation-in-part of U.S. patent application Ser. No. 13/240,226 entitled "OPTICAL DESERIALIZATION WITH GATED DETECTORS: SYSTEM AND METHOD", filed on Sep. 22, 2011, by Zanoni et al. (11CR368 ('813)), U.S. patent application Ser. No. 13/204,158 entitled "WIDE BAND DIGITAL RECEIVER: SYSTEM AND METHOD", filed on Aug. 5, 2011, by Zanoni et al. (11CR278 ('811)), U.S. patent application Ser. No. 13/626,642 entitled "OPTICAL ANALOG-TO-DIGITAL CONVERSION SYSTEM AND METHOD WITH ENHANCED QUANTIZATION", filed on Sep. 25, 2012, by Zanoni et al. (12CR1235 ('873)), and U.S. patent application Ser. No. 13/536,929 entitled "PIPELINED RECEIVER SYSTEM AND METHOD", filed on Jun. 28, 2012, by Zanoni et al. (11CR464 ('853)), all assigned to the Assignee of this patent application and incorporated by reference in their entireties herein.

FIELD OF THE INVENTION

The present specification relates to improving the performance of optically interleaved photonic analog-to-digital converters (ADC) implemented in various communications systems including radio-frequency (RF) communication systems.

Military RF system designers have long been aware that wide bandwidth, high resolution ADCs enable capabilities such as wideband staring signal intelligence (SIGINT) receivers, flexible software defined radio system architectures, and Low Probability of Intercept/Low Probability of Detection (LPI/LPD) radars. Fundamental performance limits of conventional ADCs significantly constrains the potential of these and other communication systems. In communication systems that transmit continuous communication signals, such as in RF communication systems, ADC technology is crucial element of system performance. Photonic devices and subsystems provide many advantages over conventional electronic ADC's (eADC) including precision timing and wide input bandwidths. Current ADC's are only capable of digitizing continuous communication signals with bandwidths of up to 10 GHz at less than 10 effective number of bits (ENOB) resolution.

Therefore, there is a need for an optically interleaved photonic ADC system and method to effectively overcome conventional ADC system limitations to provide an ADC capable of achieving 10 ENOB at bandwidths above 10 GHz for military and commercial operations including but not limited to radio, digital RF memory, dynamic signal modulation and wideband cueing receivers.

SUMMARY OF THE INVENTION

Embodiments of a receiver system that implements photonic processing components are disclosed herein. In one embodiment, the system includes a receiver configured to detect an analog signal, a pulsed laser emitting a series of optical pulses at a predetermined sampling rate, and timing control circuitry configured to receive the series of optical pulses and output a plurality of timing signals based on the series of optical pulses. The system also includes an optical splitter to split the series of optical pulses into at least a first optical signal and an optical reference signal, a phase modulator configured to optically sample the received analog signal using the first optical signal to output an RF phase modulated optical signal, also referred to as a sampled optical signal, a plurality of optical signal switches that receive a sampled optical signal and at least one of the plurality of timing signals to time deinterleave the optically sampled signal into a first time deinterleaved optically sampled signal and a second time deinterleaved optically sampled signal, a plurality of optical reference switches that receive the optical reference signal and at least one of the plurality of timing signals to time deinterleave the second optical signal into a first time deinterleaved optical reference signal and a second time deinterleaved optical reference signal and a plurality of demodulators wherein each demodulator receives at least one time deinterleaved optically sampled signal and at least one time deinterleaved optical reference signal.

Embodiments of a method of processing a received analog signal are also disclosed herein. In one embodiment, the method includes detecting an analog signal, producing a series of optical pulses at a predetermined sampling rate with a pulsed laser, producing a plurality of timing signals based on the series of optical pulses, splitting the series of optical pulses into at least a first optical signal and an optical reference signal, and optically sampling the detected analog signal with the first optical signal using a phase modulator to produce a sampled optical signal. The method further includes receiving a sampled optical signal and at least one of the plurality of timing signals at one of a plurality of optical signal switches to time deinterleave the optically sampled signal into a first time deinterleaved optically sampled signal and a second time deinterleaved optically sampled signal, receiving the optical reference signal and at least one of the plurality of timing signals at one of a plurality of optical reference switches to time deinterleave the optical reference signal into a first time deinterleaved optical reference signal and a second time deinterleaved optical reference signal, and receiving at least one time deinterleaved optically sampled signal and at least one time deinterleaved optical reference signal at a one of a plurality of demodulators.

Another exemplary embodiment relates to a processor for receiving a phase-modulated signal. The processor includes a phase modulator configured to provide the phase-modulated optical pulse signal, the photonic processor configured to receive a first electronic signal and an optical reference signal. The processor also includes at least one optical demodulator respectively configured to receive the phase modulated optical pulse signal on a signal path and the optical reference signal on a reference path. The demodulator is configured to perform demodulation and to provide an optical demodulated signal. The processor also includes at least one photoconverter configured to receive the optical demodulated signal and to provide a second electronic signal corresponding to the optical demodulated signal and at least one track and hold amplifier for receiving the second electric signal and providing a deinterleaved electronic signal.

Another exemplary embodiment relates to a photonic processor. The photonic processor includes a phase modulator configured to receive an electronic radio frequency signal and an optical clock signal and to provide a phase-modulated optical signal, and a set of demodulators configured to receive the phase-modulated optical signal output by the phase modulator on a signal path, and to perform demodulation of the phase-modulated optical signal in response to an optical clock signal received on a reference path. The demodulators provide respective optical first demodulated signals and respective optical second demodulated signals. The photonic processor also includes a set of first and second photo detectors configured to receive respectively the optical first demodulated signal and the optical second demodulated signal and to provide an electronic first demodulated signal and an electronic second demodulated signal, and a set of track and hold amplifiers configured to receive respective electronic first demodulated signals and respective second demodulated signals.

Another exemplary embodiment relates to a method of quantization. The method including performing phase modulation and providing a phase-modulated optical pulse signal, performing demodulation of the phase-modulated optical signal to provide an optical demodulated signal, and converting the optical demodulated signal to an electronic signal. The method also includes tracking and holding the electronic signal for reception by an electronic quantizer.

Another exemplary embodiment relates to a method of processing an analog signal. The method includes providing at least a first optical signal and an optical reference signal, optically sampling the analog signal with the first optical signal using a phase modulator to produce a sampled optical signal, and receiving the sampled optical signal at one of a plurality of optical signal switches to time deinterleave the sampled optical signal into a first time deinterleaved optically sampled signal and a second time deinterleaved optically sampled signal. The method also includes receiving the optical reference signal at one of a plurality of optical reference switches to time deinterleave the optical reference signal into a first time deinterleaved optical reference signal and a second time deinterleaved optical reference signal, and receiving at least one of the first time deinterleaved optically sampled signal and the second time deinterleaved optically sampled signal and at least one of the first time deinterleaved optical reference signal and the second time deinterleaved optical reference signal at a one of a plurality of signal processors.

BRIEF DESCRIPTION OF THE DRAWINGS

Exemplary embodiments are hereinafter described, wherein like reference numerals refer to like elements, in which:

FIG. 4A is a block diagram of a demodulator used in the photonic processor according to one exemplary embodiment;

FIG. 4B is a block diagram of a demodulator used in the photonic processor according to another exemplary embodiment;

DETAILED DESCRIPTION OF THE PREFERRED EMBODIMENTS

Figure 1:
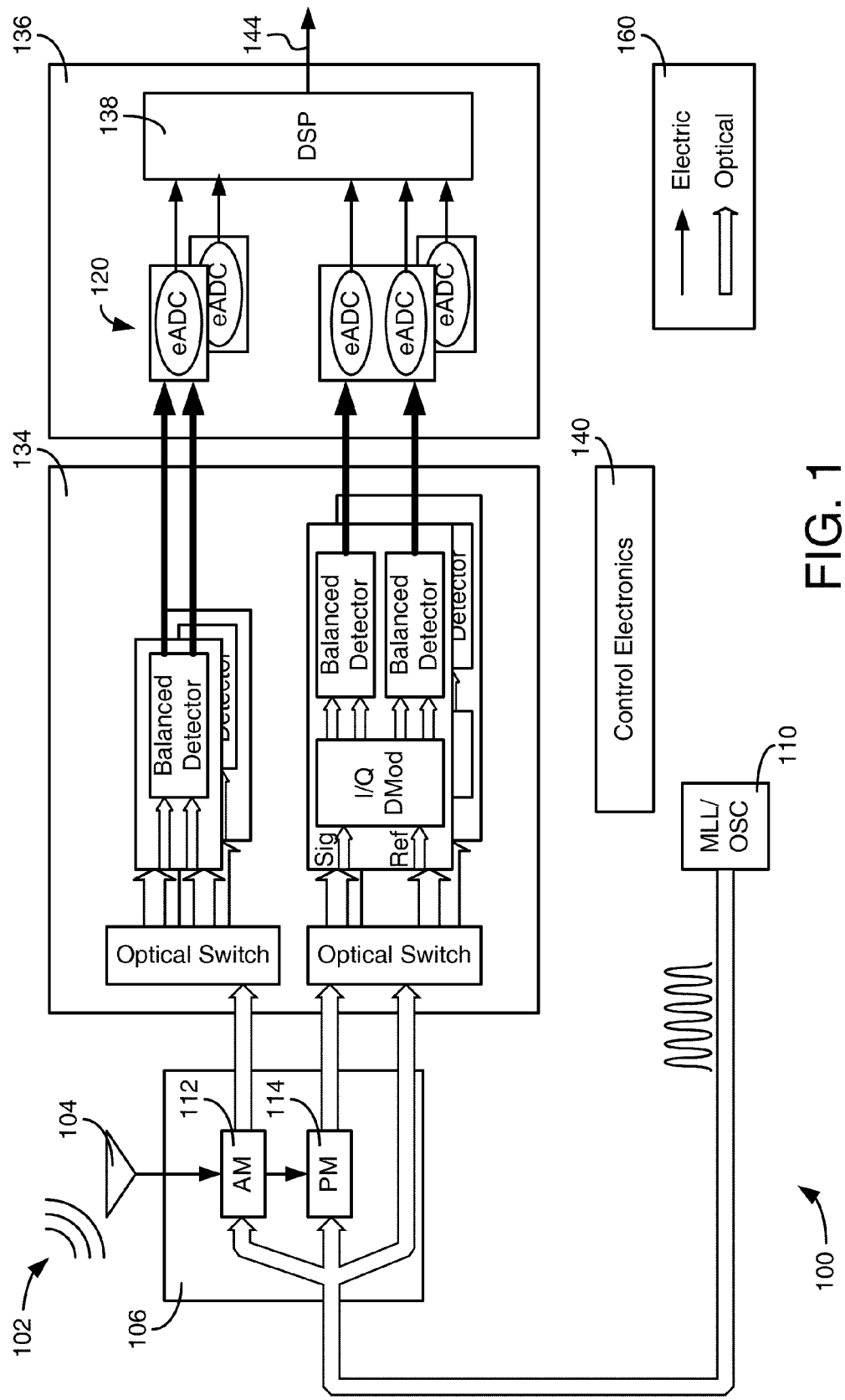
FIG. 1 is a block diagram of a receiver including an optically interleaved photonic ADC according to an exemplary embodiment.

Before describing in detail the particular improved system and method, it should be observed that the invention includes, but is not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, a receiver 100 can be used in a several applications including but not limited to military applications, medical imaging applications, radio applications, or any other commercial application (e.g., software defined radio, radio receivers capable of SIGINT operations, radar, digital RF memory, dynamic signal modulation, wideband cueing receivers, and sensor technology). Receiver 100 includes an RF antenna 104. Antenna 104 receives an analog RF signal 102 at frequencies above 10 GHz, for example. In one exemplary embodiment, the photonic processor 134 included in receiver 100 enables receiver 100 to accept and process RF signals in the W-band frequency range, from approximately 75 to 110 GHz. The received analog signal 102 can be input directly into photonic modulation element 106 or may be down converted prior to being transmitted to modulation element 106 to reduce the frequency of received analog signal 102 to an intermediate frequency (IF). According to the embodiment shown in FIG. 1, the directly received or down-converted analog signal 102 will be received by both an amplitude modulation component 112 and a phase modulation component 114.

In general, analog signal 102 is sampled at photonic modulation element 106, optically deserialized at photonic processor 134 by the optical switches and quantized at electrical analog to digital converter (eADC) 120 and processed by a digital signal processor (DSP) 138. The eADC's 120 electronically quantize electrical signals detected by the balanced detectors shown in photonic processor 134 and transmit the quantized electrical signals to digital signal processor 138, which outputs the digital information 144 originally contained in analog signal 102 for further application specific processing. The control electronics 140 used to control the pADC 130 of the W-band receiver 100 provide on-board eADC calibration, timing control, memory, and data processing to ensure effective and proper operation of the W-band receiver 100. The control electronics 140 can be enabled by way of a PC-based applications program, such as a Labview program, which provides system level instrument control, calibration, and real time data analysis. The analysis may also include the ability to calculate a least squares fit to the digitized signal in order to determine ENOB. Also, a Fourier transform calculation may be used to determine the SFDR (as computed by the PC-based applications program).

Photonic processor 134 utilized in the wide band receiver 100 can provide a scalable architecture referred to as multidimensional quantization (MDQ). One technical benefit of the MDQ system and method is an ability to increase the ENOB of the photonic ADC over that of the constituent electronic ADCs. MDQ technology also increases the SFDR of the photonic ADC over that of the constituent electronic ADCs and uses optical or hybrid optical/electrical deserialization to reduce the effective sampling rate presented to each electronic ADC. MDQ systems and methods also allow for simple correction for various imperfections of the optical receiver. For example, it allows for increasing the instantaneous bandwidth (IBW) of a wide band receiver to up to 35 GHz while maintaining a resolution of around 8 ENOB. Details of some examples of such photonic processors are described in U.S. Pat. No. 7,876,246, and U.S. Pat. No. 7,868,799, which are incorporated in their entirety herein by reference.

Referring again to FIG. 1, an analog signal 102 received by an antenna 104 is phase and amplitude encoded onto a stream of optical pulses generated by an optical laser such as a low phase noise mode locked laser (MLL) 110, for example. Performing the sampling process using phase modulated optical pulses, as contrasted to simply relaying the RF signal on a phase modulated continuous wave optical carrier to an electronic ADC for sampling, is critical in one embodiment. Optical sampling allows the sampling to occur using an ultra-low jitter optical pulse source 110. Without the low jitter associated with optical sampling, the above benefits cannot be realized, because the performance will be limited by the clock jitter on the clock that drives the electronic ADCs. Alternatively, the amplitude modulator (AM) can be provided with an input directly from a mixer or low noise amplifier (LNA) instead of from the antenna 104. The resultant optical pulses are demodulated on three separate channels including In-phase (I) and Quadrature (Q) data resulting from optical hybrid I/Q demodulation (e.g., demodulators 226 in FIG. 2) of signals from the optical phase modulator 114 and the un-modulated channel in optical modulation element 106, and amplitude data transmitted from optical amplitude modulator 112. One purpose of photonic processor 134 is to deserialize the sampled analog signal 102 with optical switches such that each of the three separate channels may be provided in parallel prior to being converted to electrical signals to effectively overcome the limitations of the relatively low speed photodiodes and electrical quantizers. Accordingly, the collective sampling rate of electrical quantization element 136 can be greatly increased depending on the number of parallel paths and the particular configuration of elements 134 and 136.

Figure 2:
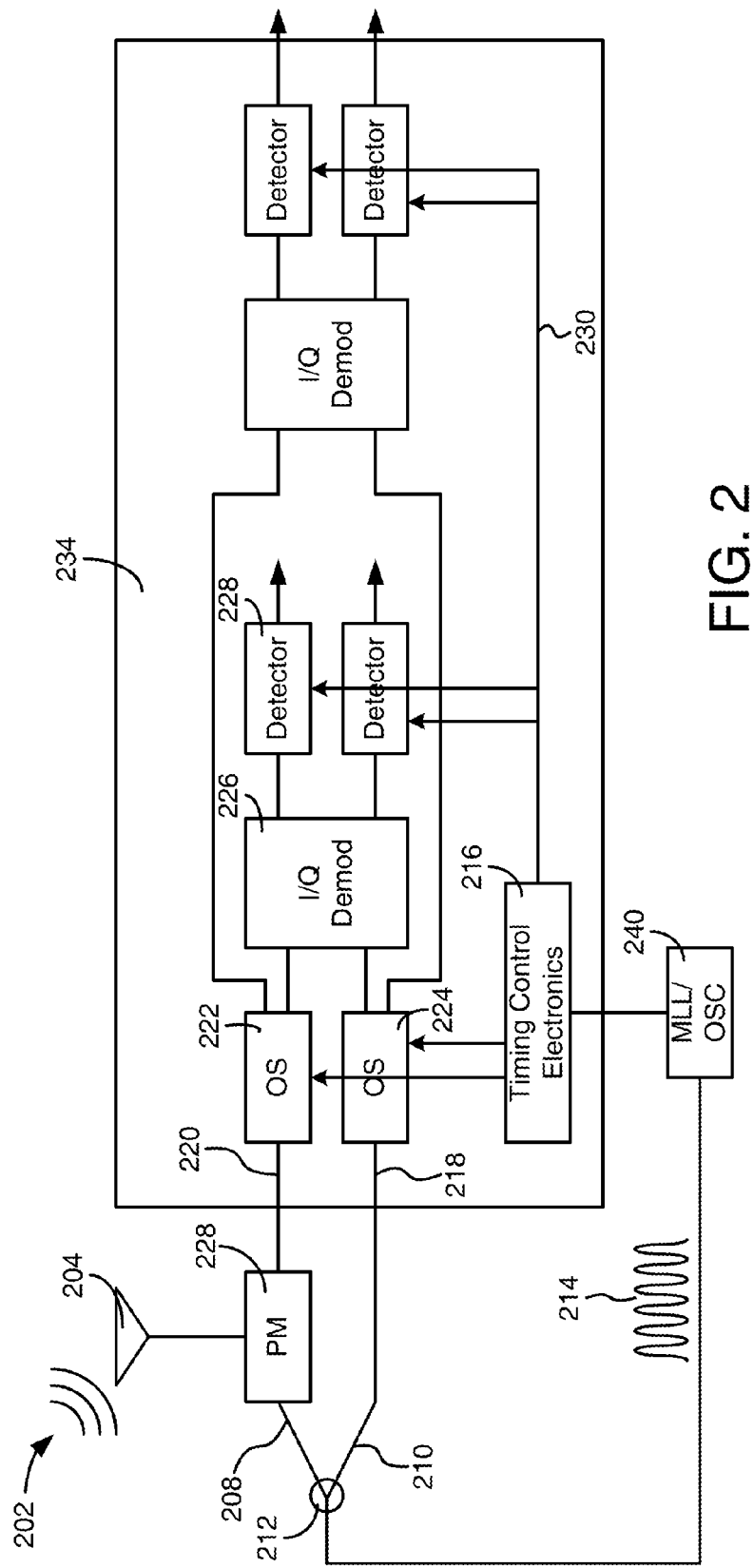
FIG. 2 is a block diagram of a photonic processor according to one exemplary embodiment.
Figure 3:
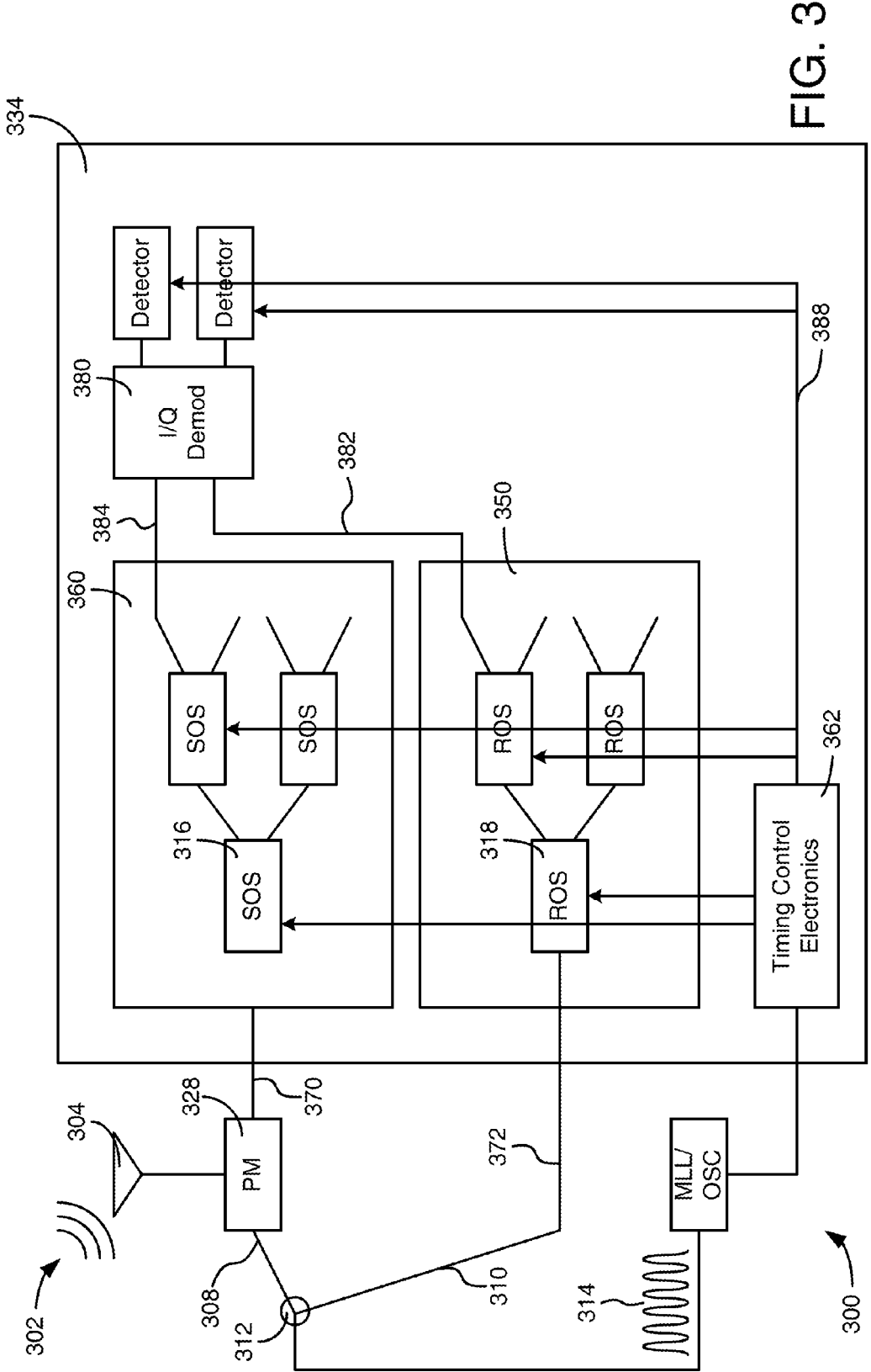
FIG. 3 is a block diagram of a photonic processor in greater detail according to another exemplary embodiment.

In the embodiment shown in FIG. 1, the optical switches provided on the signal, reference and amplitude channels time deinterleave each channel to by providing serial to parallel conversion in each optical channel according to timing signals derived from the optical pulse train from MLL 110. Deserialization happens prior to I/Q demodulation in one embodiment. FIG. 2 and FIG. 3 depict two exemplary embodiments of a system and method of deserialization using optical switches to overcome the relatively low speed electrical processing of eADC's 120 discussed in further detail below. Referring again to FIG. 1, at modulation element 106, an optical signal from laser 110 is provided to amplitude modulator 112 to create a separate amplitude channel which is used by electrical quantizer 136 to remove any $2\pi$ phase ambiguity introduced into the phase modulated signal in cases where the phase modulator 114 is driven through more than one $2\pi$ phase rotation. Accordingly, the amplitude channel is used to provide additional information to ensure an accurate phase demodulation. Although the amplitude channel is not shown in the exemplary deserialization embodiments depicted in FIG. 2 and FIG. 3 for simplicity, the amplitude channel will be structured in the same manner as the phase modulation deserialization embodiments in those figures according to one embodiment. Once the amplitude, signal and reference channels have been deserialized at photonic processor 134, each of the deserialized channels are optically demodulated and then electrically quantized by respective eADC's 120 to produce a digital electrical signal 144.

In many cases, the performance of the photonic processor 134 is determined by the low phase noise of the pulsed laser 110 while the aperture window is defined by the optical pulse width that samples the RF waveform 102 at the phase modulator 114. With respect to phase noise, a MLL 110 provides better performance than by using a continuous wave (CW) laser as it produces an optical pulse train with lower jitter and higher resolution rate optical pulses. A photonic sampling element 106, encodes the analog signal 102 onto the phase and amplitude of the optical pulse stream. A photonic processor 134 contains components for optical deserialization, I/Q demodulation, and optical to electrical detection. An electronic quantization stage 136, also referred to herein as a digitizer, includes multiple eADC's 220 per optical channel, with associated calibration, memory and processing functionality according to one exemplary embodiment. The number of eADC's per electrical channel, such as two, four, five, or more, may be utilized in the digital platform while remaining within the spirit and scope of the invention. According to one embodiment the number of eADC's is dependent on the number of time deinterleaved channels that are implemented at the optical switches shown in photonic processor 134. In addition, control electronics 140 are functionally connected to photonic processor 134 and electronic quantizer 136 to incorporate the various processes disclosed herein and to provide overall system management. Control electronics 140 may comprise at least one processor and at least one memory so that the control electronics processor can carry out instructions stored in the memory.

Referring to FIG. 2 and FIG. 3, a more detailed view of photonic processor 134 is shown. The receiver 200 shown in FIG. 2 corresponds to the timing diagram shown in FIG. 6, while the receiver 300 shown in FIG. 3 corresponds to the timing diagram shown in FIG. 5. Both FIG. 2 and FIG. 3 depict alternate embodiments for time de-interleaving the optically phase modulated signal received from phase modulator 114 and the un-modulated optical reference signal received from modulation element 106. Both FIG. 2 and FIG. 3 distribute optical pulses transmitted from laser 110 into separate optical paths according to a particular combination of optical switching and optical timing mechanisms.

Figure 5:
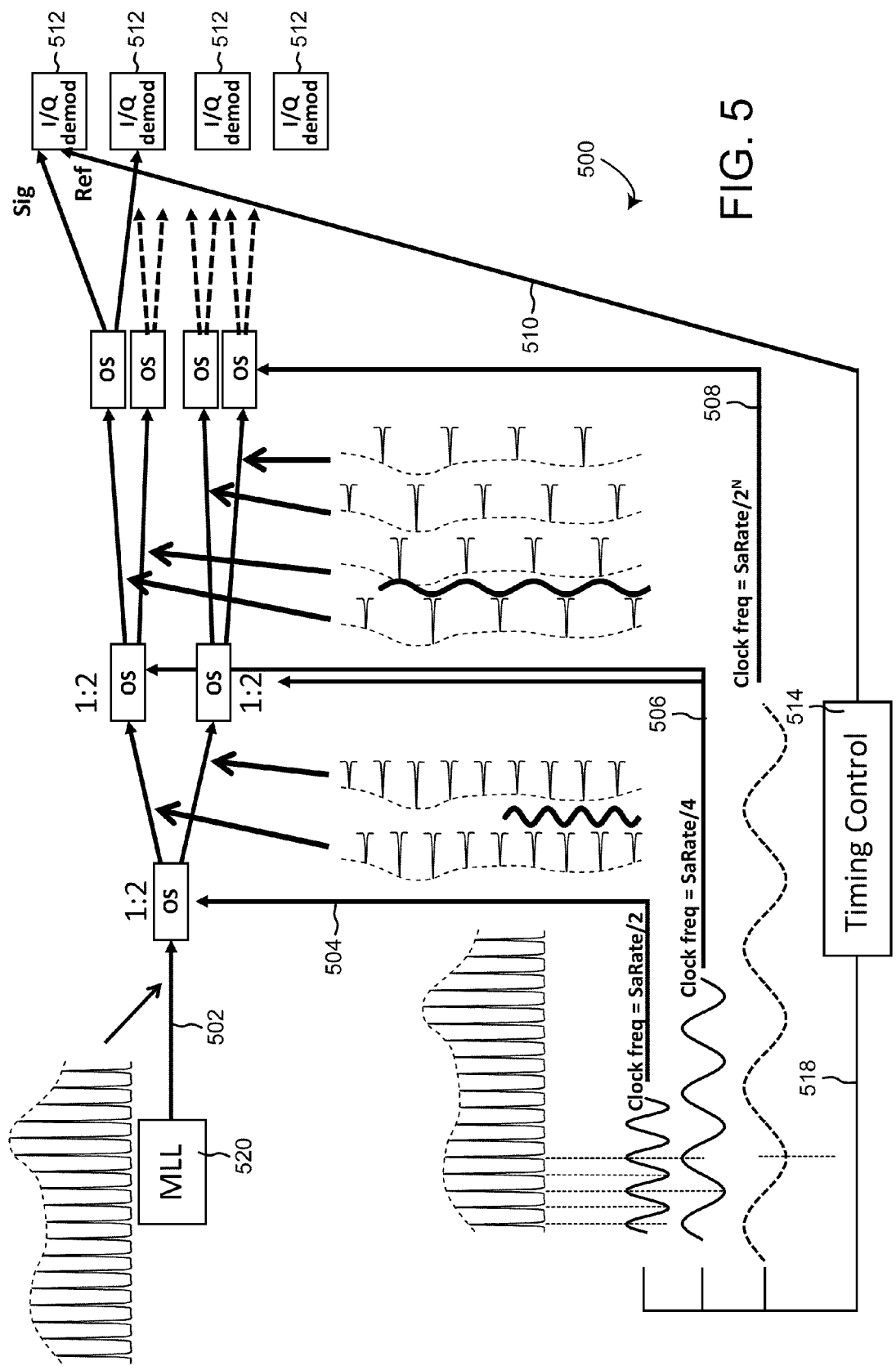
FIG. 5 is a block diagram depicting a timing control process used in a photonic processor according to one embodiment.
Figure 6:
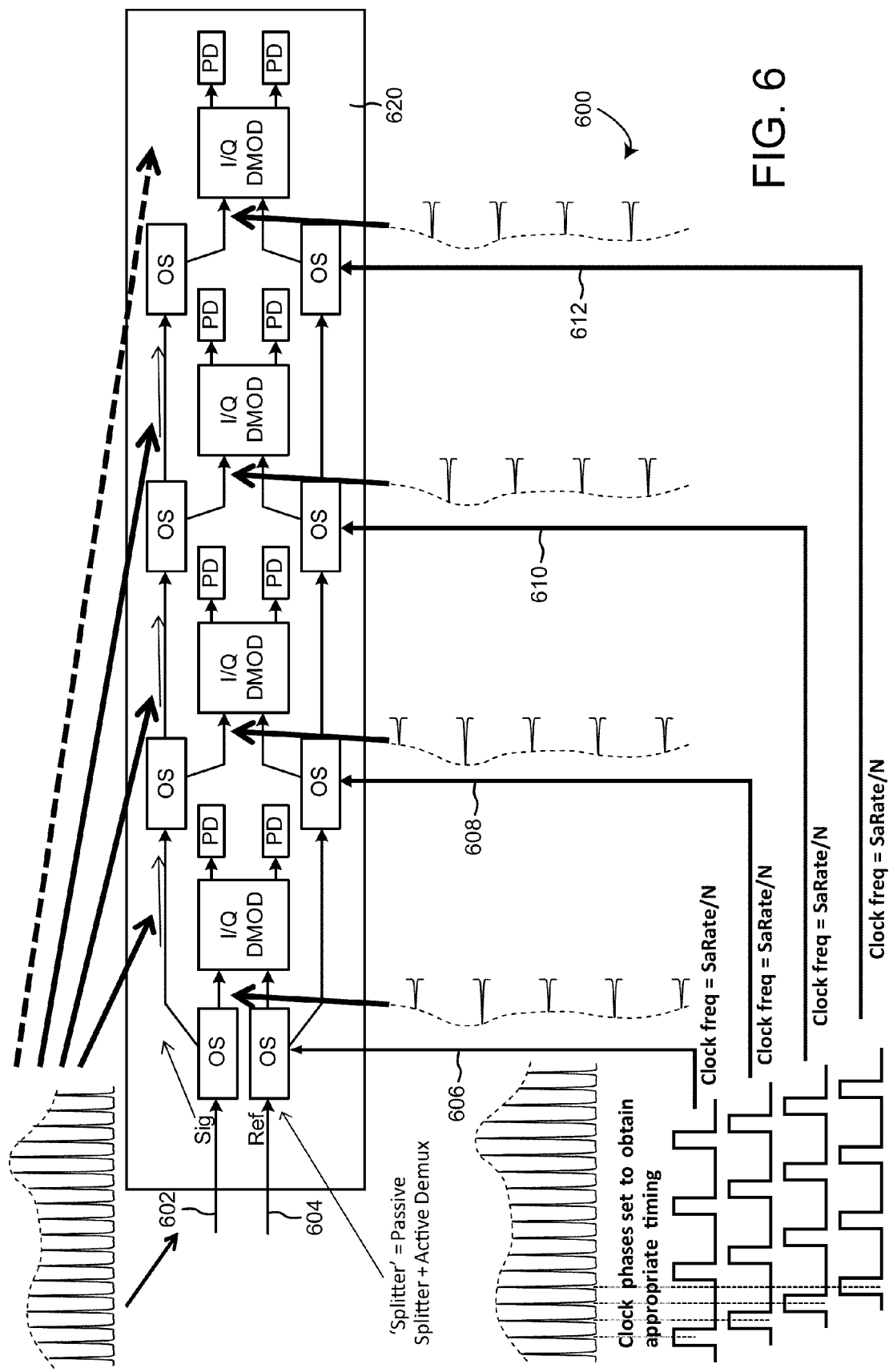
FIG. 6 is a block diagram depicting a timing control process used in a photonic processor according to another embodiment.

In both FIGS. 2-3 and 5-6, time de-interleaving the high sample rate (such as 20 Gs/s) optical pulse trains in the I and Q optical channels shown in FIG. 1 reduces the operating frequency required of each photodetector and eADC 120 shown in FIG. 1. For example, conventional eADC's are not capable of operating at a frequency high enough to detect each optical pulse in the optical pulse train transmitted from laser 110. Time de-interleaving effectively reduces the required operating of frequency eADC's 120 by dividing the optical pulse train from laser 110 into a predetermined number of temporal windows as shown in FIG. 5 and FIG. 6. According to one embodiment, the number of predetermined windows is represented by the number N. In some exemplary embodiments, the number of temporal windows is predetermined and is equal to the number of I/Q demodulators such that different only every Nth pulse is sent to an Nth I/Q demodulator.

For example, with respect to FIG. 2, MLL 240 emits an optically pulsed signal with a sample rate of 20 Gs/s according to one exemplary embodiment. In the nested de-interleaving structure of FIG. 2, the number of I/Q demodulators is two, but three, four, five, ten, forty or any other number of I/Q demodulators may be implemented. The structure of FIG. 2 also includes optical switches 222 and 224 wherein optical switch 222 time de-interleaves optical phase modulated signal 220 while optical switch 224 time de-interleaves optical reference signal 218. According to one embodiment, because there are two I/Q demodulators 226, alternate pulses in optical pulse train 214 are split between the first and second I/Q demodulators. Accordingly, electrical components receiving signals from I/Q demodulators 226, such as photodetectors 228, are only required to sample the time de-interleaved signals at a rate of 10 Gs/s, reducing the electrical detection rate by a factor of N. In this way, the nested time de-interleaving structure can be structured depending on the capabilities of electrical components and the desired analog signal bandwidth.

Referring to FIG. 2, optical pulse train 214 emitted from MLL 210 at a predetermined rate such as 20 Gs/s is provided to an optical splitter 212 and to timing control electronics 216. At splitter 212 the energy of optical pulse train 214 is split between the two output ports, one optical signal 208 optically samples analog signal 212 at phase modulator 228 at a rate of 20 Gs/s while one optical signal 210 remains un-modulated as a reference signal. According to other embodiments, splitter 212 divides optical pulse stream 214 into three separate channels, with a third channel being sent to an amplitude modulator as in FIG. 1. According to one embodiment, the amount of power sent to the amplitude modulator 112 is much lower than the amount of power sent to phase modulator 228 or the reference channel. For example, in one embodiment, approximately 1% of the power is provided the amplitude modulator to be used to track the number of $2\pi$ phase changes encoded on the signal by a phase modulator. The balance of the power (the other 99%) is split into two paths, one which is phase modulated by a phase modulator 228 and the other that is used as a reference signal by the photonic processor 234 for I/Q demodulation.

Referring again to FIG. 2, the RF signal 202 received by the RF antenna 204 modulates the optical pulse stream 208 by the phase modulator 228. After phase modulation by the RF or other analog signal 202, the optical phase modulated signal 220 is sent to optical switch 222, while optical reference signal 218 is sent to optical switch 224. Optical switches for phase modulated signals 222 and for reference signals 224 are both controlled by a common timing signal derived from MLL 240. Each optical switch 222 and 224 can be a lithium niobate switch, such as one made by E-O Space Inc., according to one exemplary embodiment. Coherent optical deinterleaving of the kind depicted in FIG. 2 and FIG. 6 require accurate synchronization between the optical pulse train 214 and the optical switches 222 and 224 as well as detectors 228. In one embodiment, detectors 228 are gated by the timing signal 230 to improve the extinction ratio, or ratio of power levels between an on and off state. In FIG. 2, because there are two I/Q demodulators, and N is equal to two, timing control electronics 216 will direct optical switches 222 to alternate sending consecutive pulses between a first and second I/Q demodulator 226 such that each demodulator only sees every other optical pulse. Accordingly, each I/Q demodulator will encounter a 10 Gs/s phase modulated optical pulse stream and a 10 Gs/s optical reference pulse steam. In this way, increasing the number of N demodulators has the effect of increasing the "off" time of each of the optical switches 228.

FIG. 6 is another example of the nested time deinterleaving architecture with a more detailed view of the timing control signals. In the embodiment depicted in FIG. 6, there are four I/Q demodulators that accordingly only receive every fourth optical pulse in the respective optical pulse trains 602 and 604. As in FIG. 2, the optical switches are controlled by timing signals 606, 608, 610 and 612 from timing control circuitry, not shown in FIG. 2. As discussed previously, the optical switches are timed according to a clock frequency that is dependent upon the number N of optical demodulators. According to one embodiment, the clock frequency is the sampling rate of MLL 240 divided by the number of optical demodulators. Providing this clock frequency to the time deinterleaving structure 600 using signals 606, 608, 610 and 612 ensures the photonic sampler 234 is synchronously clocked to the 20 Gs/s optical pulse stream.

As shown in FIG. 6, each optical switch labeled "OS" is time demultiplexing or time deinterleaving the optical signal. Each of the set of two optical switches associated with a particular I/Q demodulator receives one of four consecutive optical pulses as shown in the timing chart below nested deinterleaving structure 620. Here, for example, if optical pulse trains 602 and 604 have a sampling rate of 20 Gs/s, each I/Q demodulator will encounter an optical pulse train of 5 Gs/s. Furthermore, as indicated in FIG. 6, each of the optical timing signals 606, 608, 610, and 612, the clock frequencies sent to each optical switch are all equal. In addition, each of these optical timing signals are preferably sent to each of the balanced photodetectors 228 to improve the extinction and to each of the eADC's 120 to synchronize the received data with sampling rate of MLL 110 and to achieve a requisite extinction ratio to accurately convey a digitized version of the original analog signal 102 to processor 138 according to one exemplary embodiment.

In both FIG. 2 and FIG. 6, I/Q demodulators, shown in greater detail in FIGS. 4A and 4B, will receive de-interleaved phase modulated and reference optical signals with a reduced sampling rate. Each of the I/Q demodulators 226 may be a 90° optical hybrid demodulator shown as element 400 in FIG. 4A with two photodetectors 410 and 412 to convert the received optical signals into electrical I and Q signals. I/Q demodulators 400 may be demodulators such as ones made by Optoplex, Inc. However, the I/Q demodulators are not limited to 90° optical hybrid demodulators and may include 60° demodulators or any other variation of an I/Q demodulator. Each balanced photodetector 410, 412, 424, 426, and 428 can be a InP, 20 GHz bandwidth balanced photodetector, such as one made by $U^2T$ Photonics Inc. Other commercially available switches, I/Q demodulators, and balanced photodetectors may be used in the receiver 100 as shown in FIG. 1, while remaining within the spirit and scope of the invention. By using such devices in a preferred implementation of the first embodiment, receiver 100 is well suited for heterogeneous Si/InP chip scale integration, which is highly desirable for military and other applications that require durable and long-lasting components.

Once the optical I and Q channel signals have been converted to analog electrical signals by the balanced photodetectors, the electrical signals are quantized by eADC's 120 as shown in FIG. 1 at a rate determined by the clock frequency provided by timing control electronics 140. Furthermore, according to one exemplary embodiment, the number of eADC's is equal to 2 multiplied by N, wherein N indicates the number of I/Q optical demodulators. Finally at DSP 138, the quantized electrical signals are time multiplexed or time interleaved to reconstitute the original received analog signal 102. In addition, post processing such as impairment compensation and digital carrier phase recovery may be performed according to some exemplary embodiments.

In addition to following the general process of optical sampling, optical time deinterleaving, balanced detection and electrical quantization described above in the nested time denterleaving structure depicted in FIGS. 2 and 6, several other time deinterleaving structures may be implemented. For example, FIGS. 3 and 5 depict time deinterleaving tree architecture 300, whereby optical switches 316 for signal pulses and optical switches 318 for Q reference pulses are arranged in a tree configuration. In the embodiments shown in FIGS. 3 and 5, the plurality of signal optical switches 316 and the plurality of reference optical switches 318 are arranged in a plurality of N levels so that each level comprises an equal number of signal optical switches and reference optical switches wherein two raised to the Nth power is equal to the number of optical I/Q demodulators and each level includes two raised to the Nth power combined signal and reference optical switches according to one exemplary embodiment.

Furthermore, unlike the nested time deinterleaving structure, each optical switch contained in each of the N levels operates at a different optical clock frequency. Accordingly, in FIG. 3 and FIG. 5, the 2 raised to the power N combined optical switches associated with an Nth level receives a timing signal having a clock frequency equal to the predetermined sampling rate, such as 20 Gs/s, divided by 2 raised to the power of N. Additionally, as in the embodiments shown in FIGS. 2 and 6, the embodiments shown in FIGS. 3 and 5 can be split into three optical channels including an amplitude modulation channel as shown in FIG. 1.

Figure 7:
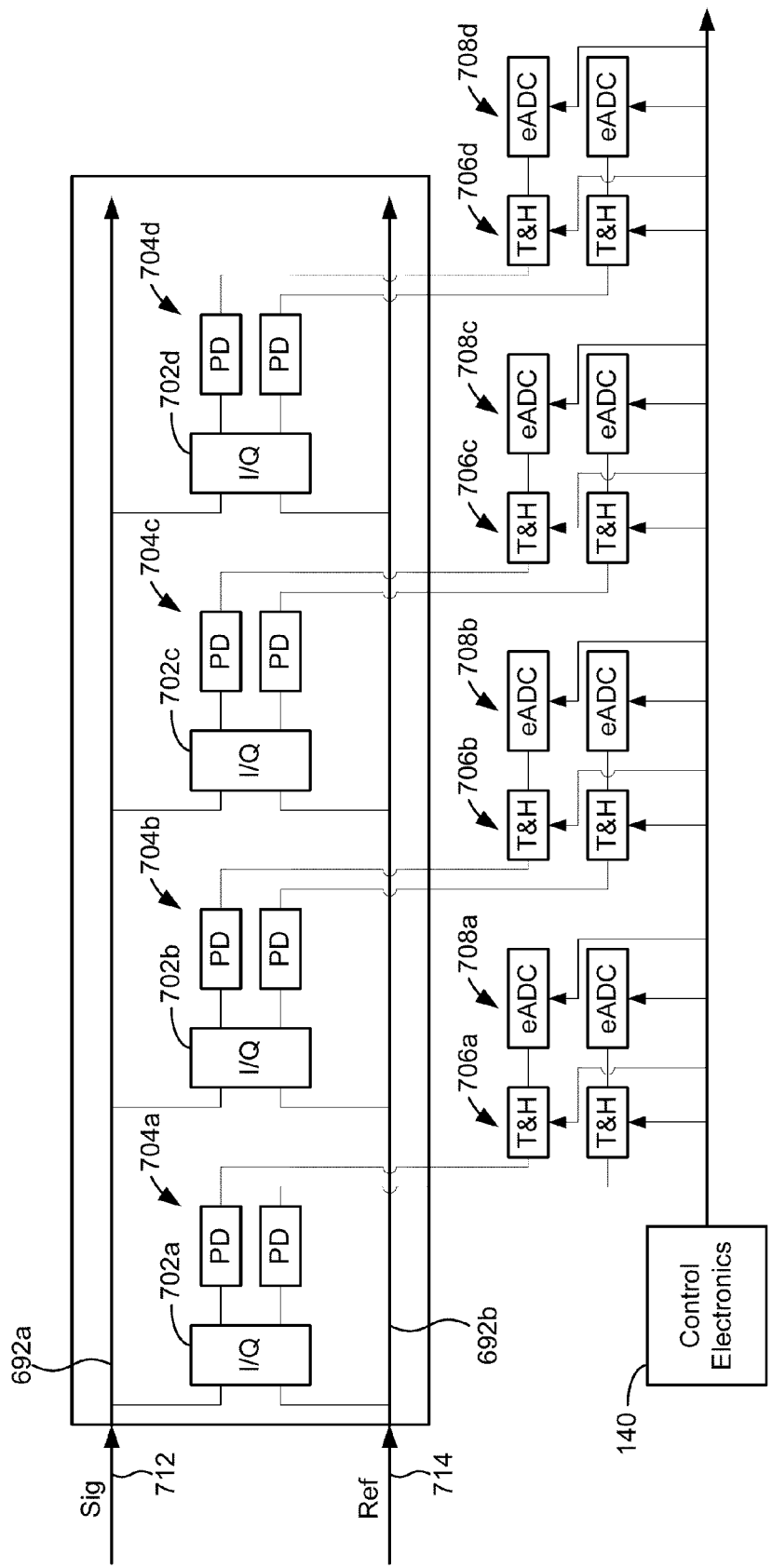
FIG. 7 is a block diagram of a photonic processor capable of use as a component within the receiver illustrated in FIG. 1 in accordance with another exemplary embodiment.

FIG. 7 is another example of the nested time deinterleaving architecture and can use timing control signals with similar criteria to the timing signals of FIG. 6. Processor 690 can be used in a system similar to system 10, but does not include optical switches on paths 682*a* and 692*b*. Processor 692 can include splitters disposed on paths 692*a* and 692*b* for providing respective phase-modulated signals and reference signals to each stage. In the embodiment depicted in FIG. 7, four I/Q demodulators 702*a-d* (e.g., one for each stage) are coupled to respective pairs of photo detectors 704*a-d*. In one embodiment, pairs of amplifiers 706*a-d* are controlled by the timing signals such that only the electric signal associated with every fourth optical pulse in the respective optical pulse trains at inputs 712 and 714 is held by respective pairs of amplifiers 702*a-d*. The timing signals from timing control circuitry 140 (FIG. 1) can be electrical timing signals converted from optical timing signals and can be received by pairs of eADCs 708*a-d*. The amplifiers 708*a-d* are timed according to a clock frequency that is dependent upon the sampling rate.

In one embodiment, pairs of amplifiers 706*a-d* have respective inputs coupled to respective outputs of pairs of photo detectors 704*a-d*. The outputs of respective pairs of electronic track and hold amplifiers 706*a-d* are coupled to pairs of quantizers or eADCs 708*a-d*. Although an embodiment with four demodulators 702*a-d* and four pairs detectors 704*a-d*, amplifiers 706*a-d* and eADCs 708*a-d* is shown, other numbers of components can be utilized without departing from the scope of the invention.

In contrast to the embodiment of FIG. 6, demodulators 704*a-d* are not coupled to optical switches and are instead coupled to reference path 692*b* and a signal path 692*b*. Track and hold amplifiers 706*a-d* receive timing signals similar to the timing signal provided to the optical switches in FIG. 6. In the embodiment depicted in FIG. 7 with four I/Q demodulators 702*a-d*, only the electrical signal associated with every fourth optical pulse in the respective optical pulse trains at inputs 712 and 714 is held by respective pairs of amplifiers 702*a-d*. Control electronics 140 can provide the timing signals. The timing signals can be converted optical timing signals from photo detectors in timing control electronics similar to electronics 362 (FIG. 3). The amplifiers 708*a-d* are timed according to a clock frequency that is dependent upon the number N of optical demodulators 702*a-d* in one embodiment. According to one embodiment, the clock frequency is the sampling rate of MLL 240 (FIG. 2) divided by the number of optical demodulators 702*a-d*. Providing this clock frequency to the time deinterleaving structure in FIG. 7 using signals similar to 606, 608, 610 and 612 (FIG. 6) ensures synchronous clocking to the 20 Gs/s optical pulse stream in one embodiment.

As shown in FIG. 7, each amplifier 706*a-d* is time demultiplexing or time deinterleaving the received electronic version of the optical signal amplifier 706*a-d*. Each of the set of amplifiers 706*a-d* associated with a respective I/Q demodulator 702*a-d* receives one of four consecutive electronic timing pulses similar to the optical signals as shown in the timing chart of FIG. 6. As indicated in FIG. 6, each of the timing signals can have equal clock frequency. In addition, each of these optical timing signals are preferably sent to each of the pairs of eADC's 708-*d* to synchronize the received data with sampling rate of MLL 110 and to achieve a requisite extinction ratio to accurately convey a digitized version of the original analog signal 102 to processor 138 according to one exemplary embodiment. Amplifers 7062A-B can be embodied as semiconductor track and hold amplifiers.].

Once the optical I and Q channel signals have been converted to analog electrical signals by the balanced photodetectors, the electrical signals are tracked and held up by amplifiers 706*a-d* for quantization by eADC's 708*a-d* at a rate determined by the clock frequency provided by timing control electronics 140. According to one exemplary embodiment, the number of eADC's is equal to 2 multiplied by N, wherein N indicates the number of I/Q optical demodulators. Finally at DSP 138 (FIG. 1), the quantized electrical signals are time multiplexed or time interleaved to reconstitute the original received analog signal 102. In addition, post processing such as impairment compensation and digital carrier phase recovery may be performed according to some exemplary embodiments.

In addition to following the general process of optical sampling, optical time deinterleaving, balanced detection and electrical quantization described above in the nested time denterleaving structure depicted in FIGS. 2 and 6, several other time deinterleaving structures may be implemented. For example, FIGS. 3 and 5 depict time deinterleaving tree architecture 300, whereby signal optical switches 316 for I channel data and reference optical switches for Q channel data are arranged in a tree configuration. In the embodiments shown in FIGS. 3 and 5, the plurality of signal optical switches 316 and the plurality of reference optical switches 318 are arranged in a plurality of N levels so that each level comprises an equal number of signal optical switches and reference optical switches wherein two raised to the Nth power is equal to the number of optical I/Q demodulators and each level includes two raised to the Nth power combined signal and reference optical switches according to one exemplary embodiment.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, dimensions and angles are mentioned, other components, dimensions and angles can be utilized. Also, receiver 100 may be implemented in a wide band RF stage system or any other type of high-frequency band receiver, such as receivers operating in the 70 GHz to 200 GHz and up range. Various changes may be made to the details disclosed without departing from the spirit of the invention which is defined by the following claims.

What is claimed is:

1. A processor, comprising:
a phase modulator the photonic processor configured to receive a first electronic signal and an optical reference signal and provide a phase modulated optical pulse signal;
an array of signal optical switches for receiving the phase modulated optical pulse signal and providing a set of time deinterleaved sampled phase modulated optical pulse signals;
an array of reference optical switches for receiving a reference pulse signal and providing a set of reference time deinterleaved reference pulse signals;
an array of optical demodulators each configured to receive a respective time deinterleaved phase modulated optical pulse signal of the time deinterleaved sampled phase modulated optical pulse signals on a respective signal path and a respective time deinterleaved reference pulse signal of the time de-interleaved reference pulse signals on a respective reference path, wherein each of the demodulators is configured to perform demodulation and to provide a respective optical demodulated signal;
an array of photoconverters each configured to receive the respective optical demodulated signal and to provide a respective second electronic signal corresponding to the respective optical demodulated signal; and
an array of track and hold amplifiers each for receiving the second respective electric signal and providing a respective deinterleaved electronic signal.

2. The processor according to claim 1, further comprising:
a clock generator configured to provide timing signals to the track and hold amplifiers.

3. The processor according to claim 2, wherein each of the photo detectors is at least one pair of photo detectors configured to detect the optical demodulated signal, the optical demodulated signal being a respective I demodulated signal and a respective Q demodulated signal.

4. The processor according to claim 3, further comprising at least one set of quantizers respectively receiving the respective second electronic signal.

5. The processor according to claim 1, wherein the signal path and the reference path are separate paths that do not directly intersect or directly connect with each other.

6. The photonic processor according to claim 1, wherein optical switches are provided between phase modulator and the signal path and no optical switches are provided between the optical demodulator and the signal path.

7. A method of quantization, the method comprising:
performing phase modulation and providing a phase-modulated optical pulse signal;
performing inphase/quadrature demodulation of the phase-modulated optical signal to provide an optical demodulated signal using deinterleaved signals provided by an array of optical switches;
converting the optical demodulated signal to an electronic signal; and
tracking and holding the electronic signal for reception by an electronic quantizer.

8. The method according to claim 7, wherein the converting step uses pairs of gated photo detectors performing photo detection of a respective I demodulated signal and a respective Q demodulated signal of the demodulated signal.

9. The method according to claim 8, wherein the tracking and holding step uses pairs of track and hold amplifiers.

10. The method according to claim 9, wherein the method deinterleaves the phase-modulated optical pulse signal.

11. The method according to claim 7, wherein a signal path receives the phase modulated optical signal and a reference path receives an optical clock signal, the signal path and the reference paths are separate paths that do not directly intersect or directly connect with each other.

12. The method according to claim 7, wherein the phase modulation uses a radio frequency electronic signal and a reference optical clock signal.

13. A photonic processor, comprising:
a phase modulator configured to receive an electronic radio frequency signal and an optical clock signal and to provide a phase-modulated optical signal;
an array of signal optical switches for receiving the phase modulated optical pulse signal and proving a set of time deinterleaved sampled phase modulated optical pulse signals;
a set of demodulators each configured to receive a respective time deinterleaved sampled phase modulated optical pulse signal of the time deinterleaved sampled phase modulated optical pulse signals from respective signal optical switches, and to perform demodulation the phase-modulated optical signal in response to an optical clock signal received on a reference path, wherein the demodulators provide respective optical first demodulated signals and respective optical second demodulated signals; and
a set of first and second photodetectors configured to receive respectively the optical first demodulated signal and the optical second demodulated signal and to provide an electronic first demodulated signal and an electronic second demodulated signal; and
a set of track and hold amplifiers configured to receive respective electronic first demodulated signals and respective second demodulated signals.

14. The photonic processor according to claim 13, further comprising:
a set of first and second electronic quantizers coupled to the first and second track and hold amplifiers, respectively, and configured to perform electronic quantization of the electronic first demodulated signal and the electronic second demodulated signal from the track and hold amplifiers respectively as first and second digital signals.

15. The photonic processor according to claim 13, wherein the first and second photo detectors are balanced.

16. The photonic processor according to claim 15, wherein a number of sets is four.

17. The photonic processor according to claim 13, further comprising:
an optical clock configured to output the optical clock signal to the phase modulator and to the reference path, wherein the phase modulator performs phase modulation of the optical signal at timings corresponding to the optical clock signal.

18. The photonic processor according to claim 13, wherein a signal path for the phase-modulated optical signal is not optically switched on the signal path.

19. The photonic processor of according to claim 18 further comprising a set of eADCS coupled to respective track and hold amplifiers.

20. The photonic processor of according to claim 19 further comprising a timing circuit coupled to the track and hold amplifiers for deinterleaving the electronic first and second demodulated signals.

21. A method of processing an analog signal, the method comprising:
- providing at least a first optical signal and an optical reference signal;
- optically sampling the analog signal with the first optical signal using a phase modulator to produce a sampled optical signal;
- receiving the sampled optical signal at one of a plurality of optical signal switches to time deinterleave the sampled optical signal into a first time deinterleaved optically sampled signal and a second time deinterleaved optically sampled signal;
- receiving the optical reference signal at one of a plurality of optical reference switches to time deinterleave the optical reference signal into a first time deinterleaved optical reference signal and a second time deinterleaved optical reference signal; and
- receiving at least one of the first time deinterleaved optically sampled signal and the second time deinterleaved optically sampled signal and at least one of the first time deinterleaved optical reference signal and the second time deinterleaved optical reference signal at a one of a plurality of signal processors, the signal processors performing optical demodulation.

\* \* \* \* \*